United States Patent [19]

Kumar

[11] Patent Number: 5,581,497
[45] Date of Patent: Dec. 3, 1996

[54] CARRY SKIP ADDER WITH ENHANCED GROUPING SCHEME

[75] Inventor: Sudarshan Kumar, Fremont, Calif.

[73] Assignee: Intel Corporation, Santa Clara, Calif.

[21] Appl. No.: 325,777

[22] Filed: Oct. 17, 1994

[51] Int. Cl.$^6$ .................................................. G06F 7/50
[52] U.S. Cl. ............................................................. 364/787
[58] Field of Search ................................. 364/768, 784, 364/786, 787, 788, 716

[56] References Cited

U.S. PATENT DOCUMENTS

| | | | |
|---|---|---|---|
| 4,737,926 | 4/1988 | Vo et al. | 364/787 |
| 4,858,168 | 8/1989 | Hwang | 364/787 |
| 4,899,305 | 2/1990 | Needles | 364/787 |
| 4,905,180 | 2/1990 | Kumar | 364/787 |
| 5,097,436 | 3/1992 | Zurawski | 364/787 |
| 5,136,539 | 8/1992 | Kumar | 364/787 |
| 5,144,163 | 9/1992 | Matsuzawa et al. | 307/446 |
| 5,327,369 | 7/1994 | Ashkenazi | 364/787 |
| 5,337,269 | 8/1994 | McMahan et al. | 364/787 |
| 5,357,457 | 10/1994 | Terane | 364/787 |
| 5,375,081 | 12/1994 | Anderson | 364/787 |
| 5,508,952 | 4/1996 | Kantabutra | 364/787 |

*Primary Examiner*—Chuong D. Ngo
*Attorney, Agent, or Firm*—Blakely, Sokoloff, Taylor & Zafman

[57] ABSTRACT

An adder is described. The adder generates a block generate signal after one domino gate delay. The adder can also generate a carry out signal, generate a first plurality of sum signals in response to the carry out signal, generate a block generate signal, generate a group generate signal, and generate a second plurality of sum signals in response to the carry out signal, block generate signal and group generate signal.

21 Claims, 13 Drawing Sheets

CARRY SKIP ADDER WITH ENHANCED GROUPING SCHEME

FIELD OF THE INVENTION

The present invention relates to the field of processor devices and in particular, to adder circuits in processor devices.

BACKGROUND OF THE INVENTION

Fundamental to the operation of virtually all digital microprocessors is the function of digital (i.e., binary) addition. Addition is used not only to provide numerical sums that a user is conscious of, but also in the implementation of numerous logic functions. In a typical microprocessor, many adders are used for these functions. When two digital words are added, the carry bit that results from the addition of the lesser significant bits must be considered. This can easily be done by rippling a carry signal as the addition is performed. A problem with this, particularly for relatively large words (e.g., 32 bits) is that substantial time is required to ripple the carry signal through the entire addition chain. And since the adders are often performing logic functions in critical time paths, the time needed to ripple the carry signal can slow up the microprocessor. This problem is dealt with in the prior art with carry look ahead circuits, skip-carry circuits and with different partitioning of group circuitry. These circuits are discussed in U.S. Pat. No. 4,737,926.

Thus, what is needed is an improved skip-carry adder that has fewer delays along critical paths in the adder and provides substantial improvement in terms of speed of operation when compared to prior art adders.

SUMMARY OF THE INVENTION

A novel adder is described. The adder generates a block generate signal within one domino gate delay. Alternatively, the adder can generate a carry out signal, generate a first plurality of sum signals in response to the carry out signal, generate a block generate signal, generate a group generate signal, and generate a second plurality of sum signals in response to the carry out signal, block generate signal and group generate signal.

A computer system is also described. The computer system comprises a display device for displaying information, memory for storing information, and a microprocessor coupled to the memory and the display device having an 8n bit partitioned, skip-carry adder with a first group capable of generating sum signals for n bits, a second group capable of generating sum signals for 2n bits and capable of generating a first group propagate signal, a third group capable of generating sum signals for 3n bits and capable of generating a second group propagate signal, and a fourth group capable of generating sum signals for 2n bits.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A novel adder is described. In the following detailed description, numerous specific details are set forth such as specific circuits (e.g., specific gates) in order to provide a thorough understanding of the present invention. However, it will be understood by those skilled in the art that the present invention may be practiced without these specific details. In other instances well known methods, procedures, components, and circuits have not been described in detail so as not to obscure the present invention.

Some portions of the detailed descriptions which follow are presented in terms of algorithms and symbolic representations of operations on data bits within a computer memory. These algorithmic descriptions and representations are the means used by those skilled in the art to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
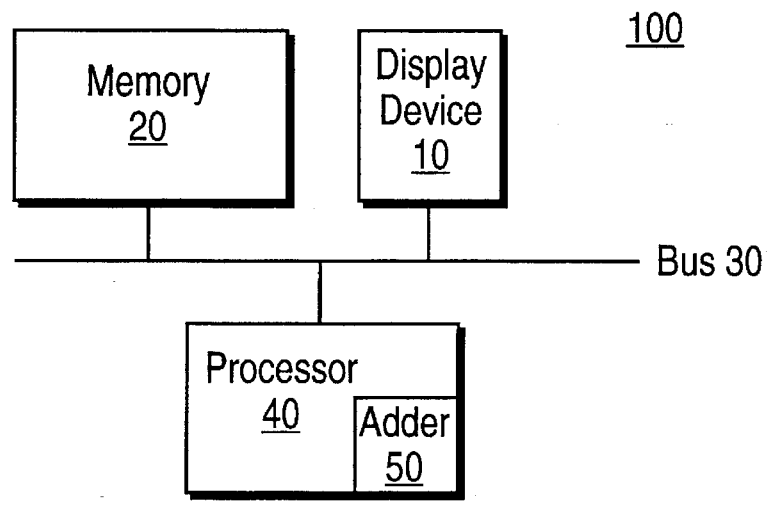
FIG. 1 illustrates in block diagram form the computer system of one embodiment of the present invention.

FIG. 1 illustrates in block diagram form the computer system of one embodiment of the present invention. Computer system 100 comprises display device 10, memory 20, bus 30 and processor 40. Display device 10 is coupled to processor 40 by bus 30. Display device 10 can be a television set, a computer monitor, flat panel display or other display device. Memory 20 can be a random access memory (RAM) or other semiconductor memory. Bus 30 can be an Industry Standard Architecture (ISA), Extended Industry Standard Architecture (EISA), Peripheral Component Interconnect (PCI) or other bus. Processor 40 can be a complex instruction set computing (CISC) microprocessor, reduced instruction set computing (RISC) microprocessor or other microprocessor. Processor 40 comprises adder 50. Adder 50 is an 8n bit partitioned, skip-carry adder with four groups. The first group can generate sum signals for n bits. The second group can generate sum signals for 2n bits and can generate a first group propagate signal. The third group can generate sum signals for 3n bits and can generate a second group propagate signal. The fourth group can generate sum signals for 2n bits.

Figure 2:
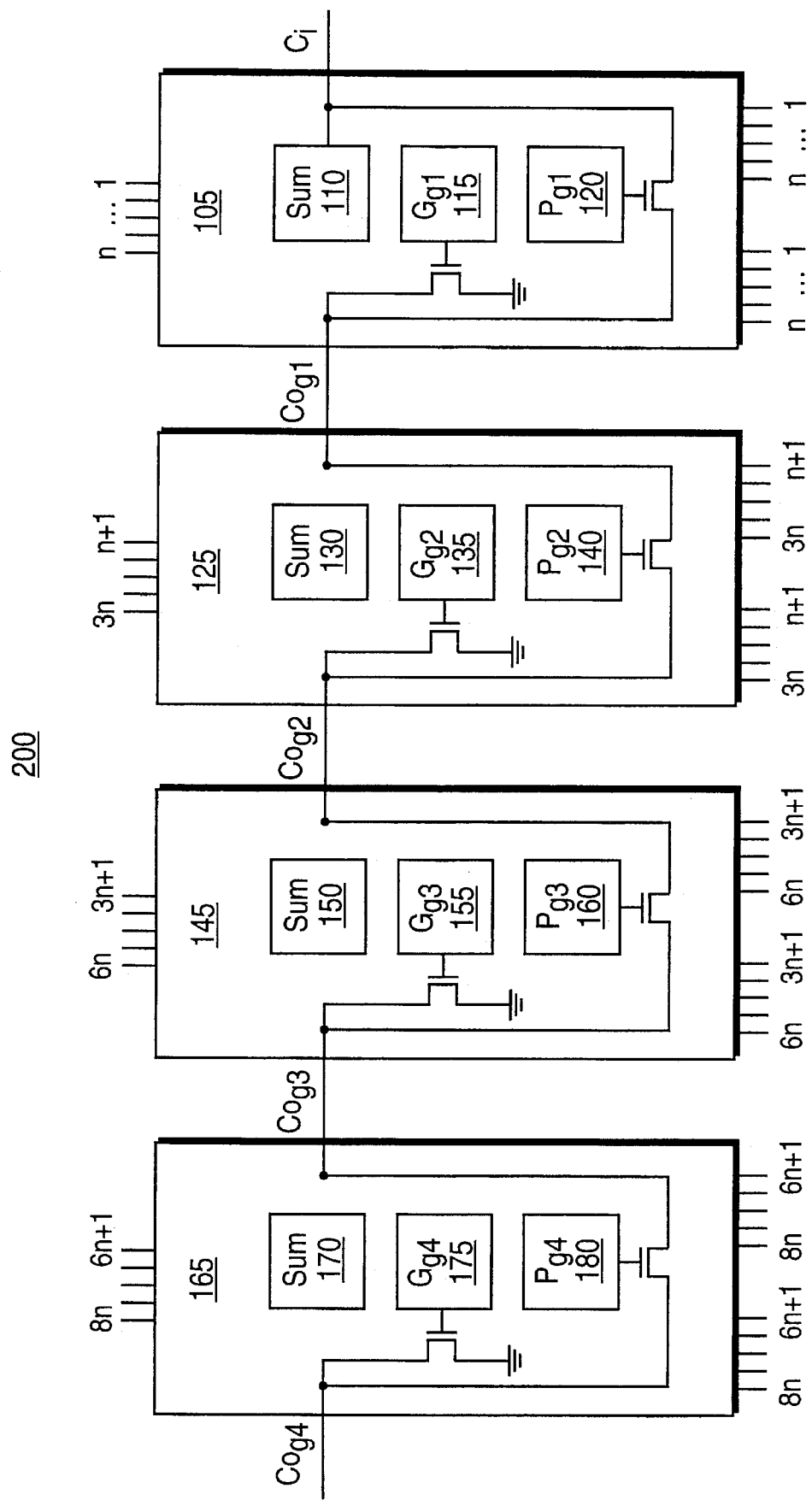
FIG. 2 illustrates in block diagram form an adder of a second embodiment of the present invention.

FIG. 2 illustrates in block diagram form an adder of a second embodiment of the present invention. Adder 200 receives as its inputs two 8n bit binary numbers and a carry-in signal ($C_i$). Adder 200 outputs a sum signal for each of the 8n bits. Each sum signal represents 1 bit of the sum of the two binary numbers. Adder 200 also outputs a carry-out signal ($C_{og4}$). Adder 200 comprises 4 groups, group 105, group 125, group 145 and group 165. Group 105 is coupled to group 125. Group 125 is coupled to group 145 and group 145 is coupled to group 165. Group 105 receives as inputs a carry-in signal and n bits of the two binary numbers. Group 105 outputs sum signals representing the n bits of the sum of the two binary numbers. Group 105 comprises sum device 110 group generate device 115 ($G_{g1}$) and group propagate device 120 ($P_{g1}$). Sum device 110 receives as inputs the carry-in signal and n bits of the two binary numbers. Sum device 110 outputs sum signals representing n bits of the sum of the two binary numbers. Group generate device 115 receives as inputs the n bits of the two binary numbers. Group generate device 115 generates a group generate signal when the sum of the n bits of the two binary numbers results in a carry to the n+1 bit. Group propagate device 120 receives as inputs the n bits of the two binary numbers. Group propagate device 120 generates a group propagate signal when the two binary numbers are such that a carry from previous bits (the carry-in signal) results in a carry to the n+1 bit. Group generate device 115 and group propagate device 120 are each coupled to a n channel transistor acting as a switch. In this manner, when group generate device 115 generates a group generate signal, group 105 generates a carry-out signal ($C_{og1}$) to group 125. Group 105 also generates a carry-out signal to group 125 when group propagate device 120 generates a group propagate signal combined with a carry-in signal from previous bits.

Group 125 operates similarly to group 105. It receives as inputs n+1 to 3n bits of the two binary numbers and the carry-out signal generated by group 105. It outputs sum signals representing the n+1 to 3n bits of the sum of the two binary numbers and also outputs a carry-out signal ($C_{og2}$) to group 145. Group 125 comprises sum device 130, group generate device 135 and group propagate device 140. Sum device 130, group generate device 135 and group propagate device 140 operate similarly to sum device 110, group generate device 115 and group propagate device 120 respectively. Sum device 130, group generate device 135 and group propagate device 140 differs only in that they accept as inputs n+1 to 3n bits of the two binary numbers and generate sum, group generate and group propagate signals accordingly.

Group 145 receives as inputs the 3n+1 to 6n bits of the two binary numbers and the carry-out signal ($C_{og2}$) from group 125. Group 145 outputs the sum signals for the 3n+1 to 6n bits of the sum of the two binary numbers and a carry-out ($C_{og3}$) to group 165. Group 145 comprises sum device 150, group generate device 155 and group propagate device 160. Sum device 150, group generate device 155 and group propagate device 160 operate similar to the sum devices, group generate devices and group propagate devices described above with the exception that they accept as inputs 3n+1 to 6n bits of the two binary numbers.

Group 165 receives as inputs the 6n to 8n bits of the two binary numbers and the carry-out signal ($C_{og3}$) from group 145. It outputs sum signals representing 6n+1 to 8n bits of the sum of the two binary numbers and a carry-out signal ($C_{og4}$). Group 165 comprises sum device 170, group generate device 175 and group propagate device 180 all of which accept as inputs 6n+1 to 8n bits of the two binary numbers and operate similarly to the sum devices, group generate devices and group propagate devices described above.

Figure 3:
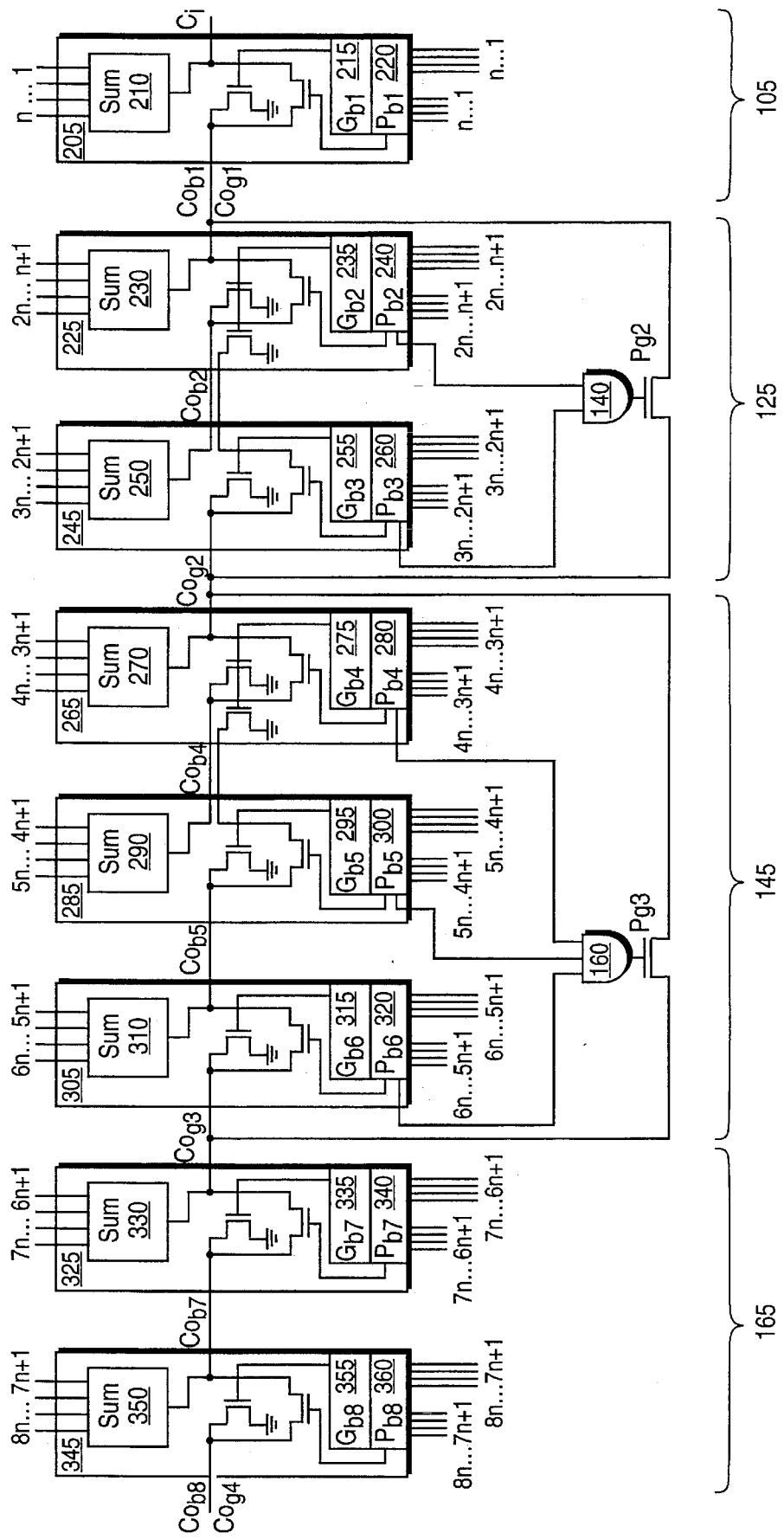
FIG. 3 illustrates in block diagram form the adder of a third embodiment of the present invention.

FIG. 3 illustrates in block diagram form the adder of a third embodiment of the present invention. In this embodiment, group 105 comprises block 205. Block 205 receives as inputs a carry-in signal and the first n bits of the two binary numbers. Block 205 outputs sum signals representing the first n bits of the sum of the two binary numbers. Block 205 also outputs a carry-out signal for the block 205 ($C_{ob1}$). This signal is also the carry-out signal for group 105 ($C_{og1}$). Block 205 comprises sum device 210, block generate device 215 and block propagate device 220. Sum device 210 receives as inputs the first n bits of the two binary numbers and the carry-in signal. Block generate device 215 operates similarly to group generate device 115 of FIG. 2. Block generate device 215 generates a block generate signal when the sum of the first n bits of the two binary numbers results in a carry to the n+1 bit. The block generate signal activates an n channel transistor acting as a switch. In this manner, carry-out signal to block 225 ($C_{ob1}$) is generated. Block propagate device 220 operates similar to group propagate device 120 of FIG. 2 except that block propagate device 220 receives as inputs the first n bits of the two binary numbers. When the first n bits of the two binary numbers are such that the carry-in signal results in a carry to the n+1 bit, block propagate device 220 generates a block propagate signal. This signal activates an n channel transistor acting as a switch. The n channel transistor is coupled to the carry-in signal line and transmits the carry-in signal through block 205 when block propagate device 220 generates a block propagate signal. In this manner, the carry-out signal to block 225 is generated by a block generate signal or a block propagate signal with a carry-in signal.

Group 125 receives the carry-out signal from block 205. Group 125 comprises block 225, block 245 and group propagate device 140. Block 225 receives as inputs the carry-out signal from block 205 and the second n bits of the two binary numbers. Block 225 outputs sum signals representing the second n bits of the sum of the two binary numbers, a carry-out signal ($C_{ob2}$) to block 245 and a block propagate signal to group propagate device 140. Block 225 comprises sum device 230, block generate device 235 and block propagate device 240. Sum device 230, block generate device 235 and block propagate device 240 operate similarly to the sum devices, block generate, group generate, block propagate and group generate devices described above. The difference is that sum device 230, block generate device 235 and block propagate device 240 accept the second n bits of the two binary numbers as inputs. Block 245 receives as inputs the third n bits of the two binary numbers and the carry-out signal ($C_{ob2}$) from block 225. Block 245 outputs sum signals representing the third n bits of the sum of the two binary numbers, a carry-out signal ($C_{og2}$) to block 265 and a block propagate signal to group propagate device 140. Block 245 comprises sum device 250, block generate device 255 and block propagate device 260, all of which operate similarly to the devices described above.

Group 125 also comprises group propagate device 140. In this embodiment, group propagate 140 is an AND gate. AND gate 140 receives as inputs the block propagate signal from block propagate device 240 and the block propagate signal from block propagate 260. AND 140 outputs the group propagate signal for group 125 and is coupled to an n channel transistor acting as a switch. When the group propagate signal is generated, the carry-out signal from 205 is transmitted through group 125 and thus a carry-out signal for group 125 is generated. It will be appreciated that in this embodiment sum device 230 and sum device 250 performs the functions of sum device 130 of FIG. 2. In addition, block generate device 235, block generate device 255 and block propagate device 260 perform the functions of group generate device 135 of FIG. 2. Group 125 generates a carry-out signal ($C_{og2}$) of group 145 to block 265.

Group 145 comprises block 265, block 285, block 305 and group propagate device 160. Block 265 receives as inputs a carry-out signal ($C_{og2}$) from group 125 and the fourth n bits of the binary numbers. Block 265 outputs the fourth n bits of the sum of the binary numbers, a carry-out signal ($C_{ob4}$) to block 285 and a block propagate signal to group propagate device 160. Block 265 comprises sum device 270, block generate device 275 and block propagate device 280. Sum device 270, block generate device 275 and block propagate device 280 operate similarly to the sum devices, block generate devices and block propagate devices described above with the exception that they receive as inputs the fourth n bits of the two binary numbers. Block 285 receives as inputs the carry-out signal ($C_{ob4}$) from block 265 and the fifth n bits of the two binary numbers. Block 285 outputs the fifth n bits of the sum two binary numbers, a carry-out signal ($C_{ob5}$) to block 305 and a block propagate signal to group propagate device 160. Block 285 comprises sum device 290, block generate device 295 and block propagate device 300. Sum device 290, block generate device 295 and block propagate device 300 operate similarly to the stun devices, block generate devices and block propagate devices as described above with the exception that they receive as inputs the fifth n bits of the two binary numbers. Block 305 receives as inputs the carry-out signal ($C_{ob5}$) from block 285 and the sixth n bits of the two binary numbers. Block 305 outputs the sixth n bits of the sum of the two binary numbers, a block propagate signal to group propagate device 160 and the carry-out signal ($C_{og3}$) for group 145.

Group 145 also comprises group propagate device 160 which in this embodiment is an AND gate. AND gate 160 receives as inputs the block propagate signal from block propagate device 280, the block propagate signal from block propagate device 300 and the block propagate signal from block propagate device 320. AND gate 160 outputs the group propagate signal for group 145 and is coupled to a n channel transistor acting as a switch. When AND gate 160 transmits a group propagate signal, the carry-out signal from group 125 ($C_{og2}$) is transmitted through group 145 and becomes the carry-out signal from group 145 ($C_{og3}$). It will be appreciated that in this embodiment, sum device 270, sum device 290 and sum device 310 accomplish the functions of sum device 150 of FIG. 2. In addition, block generate device 275, block generate device 295, block generate device 315, block propagate device 300 and block propagate device 320 accomplish the functions of group generate device 155 of FIG. 2. In this manner, group 145 transmits a carry-out signal ($C_{og3}$) to group 165.

Group 165 comprises block 325 and block 345. Block 325 receives as inputs the carry-out signal ($C_{og3}$) from group 145 and the seventh n bits of the two binary numbers. Block 325 comprises sum device 330, block generate device 335 and block propagate device 340 all of which operate similarly as described above except that they receive as inputs the seventh n bits of the binary numbers. Block 325 outputs the seventh n bits of the sum of the two binary numbers and a carry-out signal ($C_{ob7}$) to block 345. Block 345 receives as inputs the carry-out signal ($C_{ob7}$) from block 325 and the eighth n bits of the two binary numbers. Block 345 comprises sum device 350, block generate device 355 and block propagate device 360 all of which operate similarly to the sum devices, block generate devices and block propagate devices described above with the exception that they receive as inputs the eighth n bits of the two binary numbers. Block 345 outputs the eighth n bits of the sum of the two binary numbers and a carry-out signal ($C_{ob8}$). This signal is also the carry-out signal for group 165 ($C_{og4}$).

Figure 4:
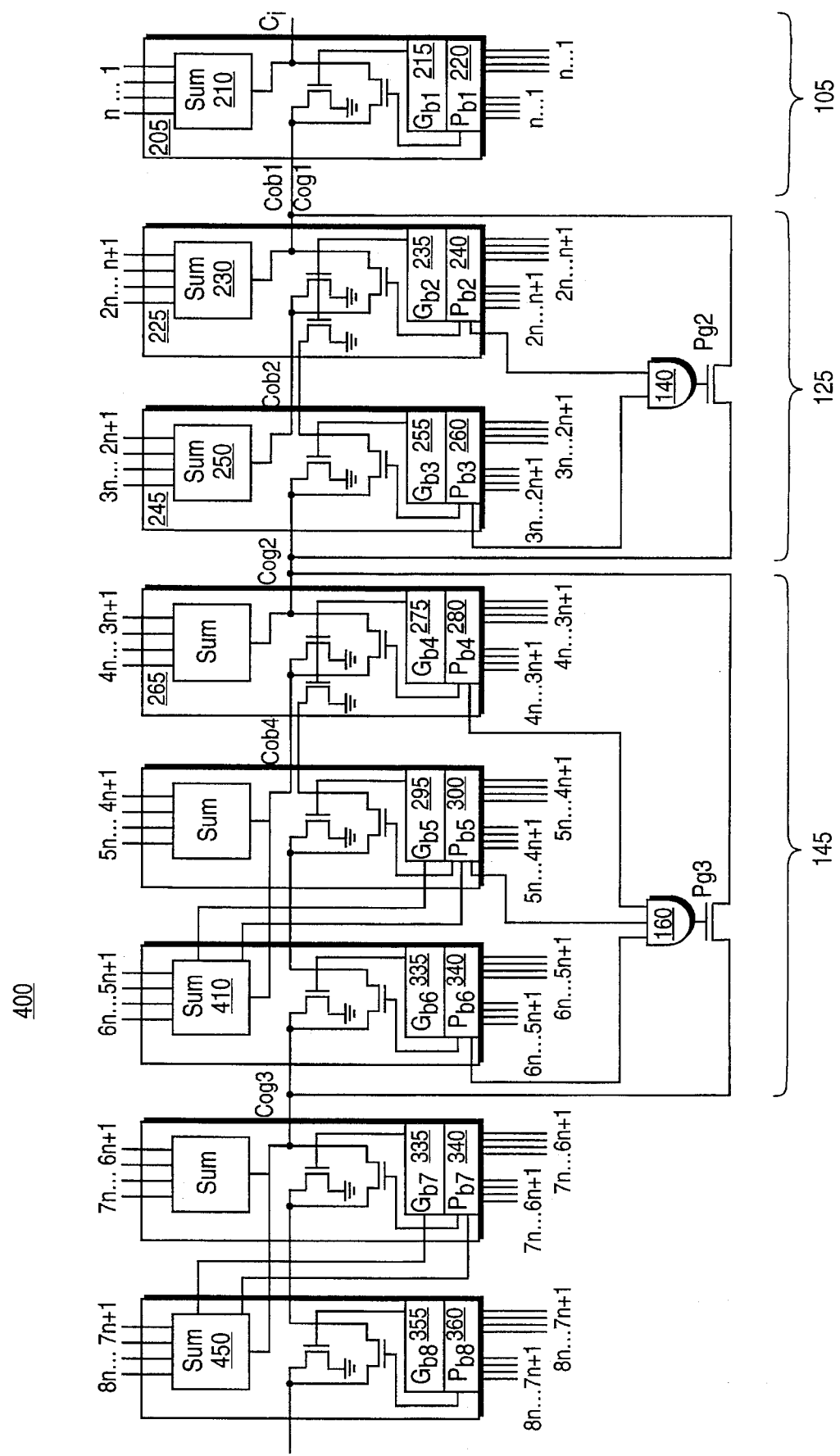
FIG. 4 illustrates in block diagram form an adder of a fourth embodiment of the present invention.

FIG. 4 illustrates in block diagram form an adder of a fourth embodiment of the present invention. The adder of FIG. 4 is similar to the adder of FIG. 3 with the exception that sum device 310 of FIG. 3 is replaced by sum device 410 and sum device 350 of FIG. 3 is replaced by sum device 450. Sum device 410 receives as inputs the carry-out signal from block 265 ($C_{ob4}$), the block generate signal from block generate device 295, the block propagate signal from block propagate device 300 and the sixth n bits of the two binary numbers. Based on these inputs, sum device 410 generates sum signals representing the sixth n bits of the sum of the two binary numbers. Sum device 410 does not utilize $C_{ob}5$ as an input and thus it does not have to wait for a carry signal to ripple through block 285. Similarly, sum device 450 receives as inputs the carry-out signal from group 145 ($C_{og3}$), the block generate signal from block generate device 335, the block propagate signal from block propagate device 340 and the eighth n bits of the two binary numbers. Based on these inputs, sum 450 outputs the eighth n bits of the sum of the two binary numbers. Sum device 450 does not utilize $C_{ob}7$ as an input and thus it does not have to wait for a carry signal to ripple through block 325. With sum device 410 and sum device 450, the grouping scheme illustrated in FIG. 4 is characterized as 1+1, 1+2, 2, 1.

Using the grouping scheme of FIG. 4, adder 400 can generate sum signals, carry signals, block generate signals, block propagate signals and group propogate signals as described in Table 1.

TABLE 1

| | |
|---|---|
| One Domino Gate Delay, | $G_{b1}$, $G_{b2}$, $G_{b3}$, $G_{b4}$, $G_{b5}$, $G_{b6}$, $G_{b7}$, $G_{b8}$ |
| One Precharge Cycle, One Discharge Cycle | $P_{b1}$, $P_{b2}$, $P_{b3}$, $P_{b4}$, $P_{b5}$, $P_{b6}$, $P_{b7}$, $P_{b8}$ |
| Two Domino Gate Delays, | sum (bits 1 . . . n) |

TABLE 1-continued

| | |
|---|---|
| Two Precharge Cycles, | $C_{og1}$ |
| Two Discharge Cycles | $P_{g2}, P_{g3}$ |
| Three Domino Gate Delays, | sum (bits n + 1 ... 2n) |
| Three Precharge Cycles, | $C_{og2}$ |
| Three Discharge Cycles | $C_{ob2}$ |
| Four Domino Gate Delays, | sum (bits 2n + 1 ... 3n) |
| Four Precharge Cycles, | sum (bits 3n + 1 ... 4n) |
| Four Discharge Cycles | $C_{og3}$ |
| | $C_{ob4}$ |
| Five Domino Gate Delays, | sum (bits 4n + 1 ... 5n) |
| Five Precharge Cycles, | sum (bits 5n + 1 ... 6n) |
| Five Discharge Cycles | sum (bits 6n + 1 ... 7n) |
| | sum (bits 7n + 1 ... 8n) |

In this embodiment, n equals 4 and the adder 400 is a 32 bit adder. Other adders can be constructed using the configurations as described in Table 2.

TABLE 2

| | # of blocks | |
|---|---|---|
| 16 bit adder | 4 | 1, 2, 1 |
| 20 bit adder | 5 | 1 + 1, 2, 1 |
| 24 bit adder | 6 | 1, 2, 2, 1 |
| 28 bit adder | 7 | 1 + 1, 2, 2, 1 |
| 32 bit adder | 8 | 1 + 1, 1 + 2, 2, 1 |
| 36 bit adder | 9 | 1, 2, 3, 2, 1 |
| 40 bit adder | 10 | 1 + 1, 2, 3, 2, 1 |
| 44 bit adder | 11 | 1 + 1, 1 + 2, 3, 2, 1 |
| 48 bit adder | 12 | 1, 2, 3, 3, 2, 1 |
| 52 bit adder | 13 | 1 + 1, 2, 3, 3, 2, 1 |
| 56 bit adder | 14 | 1 + 1, 1 + 2, 3, 3, 2, 1 |
| 60 bit adder | 15 | 1 + 1, 1 + 2, 1 + 3, 3, 2, 1 |
| 68 bit adder | 17 | 1 + 1, 1 + 2, 3, 4, 3, 2, 1 |
| 72 bit adder | 18 | 1 + 1, 1 + 2, 3, 4, 3, 2, 1 |
| 76 bit adder | 19 | 1 + 1, 1 + 2, 1 + 3, 4, 3, 2 |
| 80 bit adder | 20 | 1, 2, 3, 4, 4, 3, 2, 1 |

Figure 5:
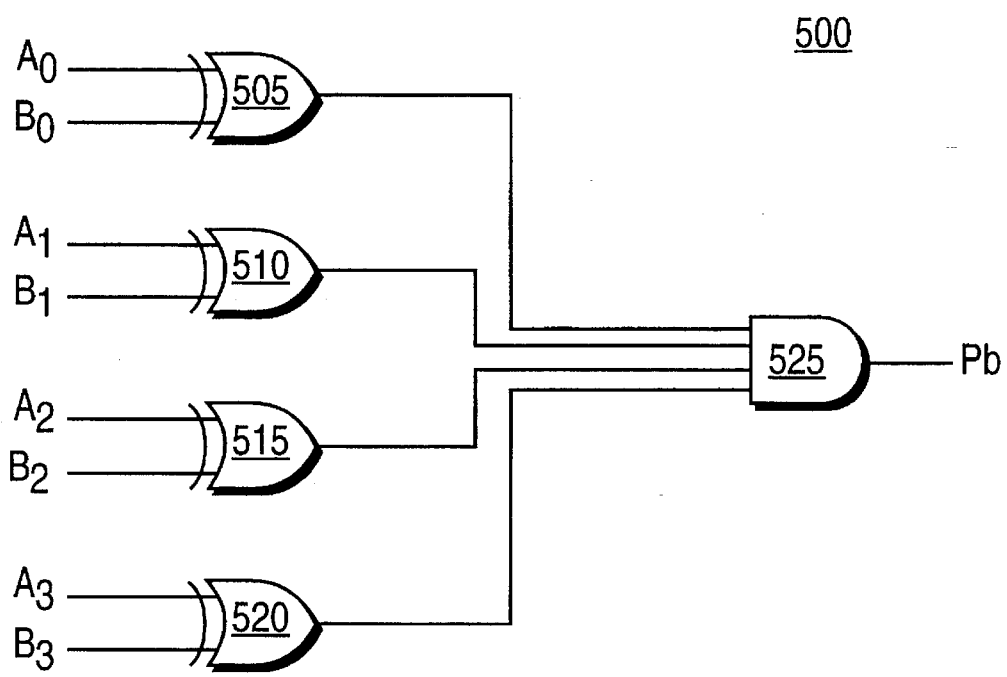
FIG. 5 illustrates in logic diagram form the block propagate device of a fifth embodiment of the present invention.

FIG. 5 illustrates in logic diagram form the block propagate device of a fifth embodiment of the present invention. In this embodiment, the adder is a 32 bit adder and thus n equals 4. Each block of the adder receives as inputs four bits of two binary numbers. The four bits of the first binary number are labeled $A_0$, $A_1$, $A_2$, $A_3$. The four bits of the second binary number are labeled $B_0$, $B_1$, $B_2$, $B_3$. Block propagate device 500 comprises exclusive-OR gates 505, 510, 515 and 520. Block propagate device 500 also comprises AND gate 525. Block propagate device 500 receives the $A_0$ bit and the $B_0$ bit inputting them to exclusive-OR gate 505. Block propagate device 500 also receives the $A_1$ bit and the $B_1$ bit inputting them into exclusive-OR gate 510. Likewise, block propagate device 500 receives the $A_2$ bit and the $B_2$ bit inputting them into exclusive-OR gate 515. Block propagate device 500 receives the $A_3$ bit and the $B_3$ bit inputting them into exclusive-OR gate 520. The outputs of exclusive-OR gates 505, 510, 515 and 520 are provided as inputs to AND gate 525. In this manner, AND gate 525 generates the block propagate signal. Block propagate device 500 can be used in place of block propagate device 220, 240, 260, 280, 300, 320, 340 or 360 of FIG. 3.

Figure 6:
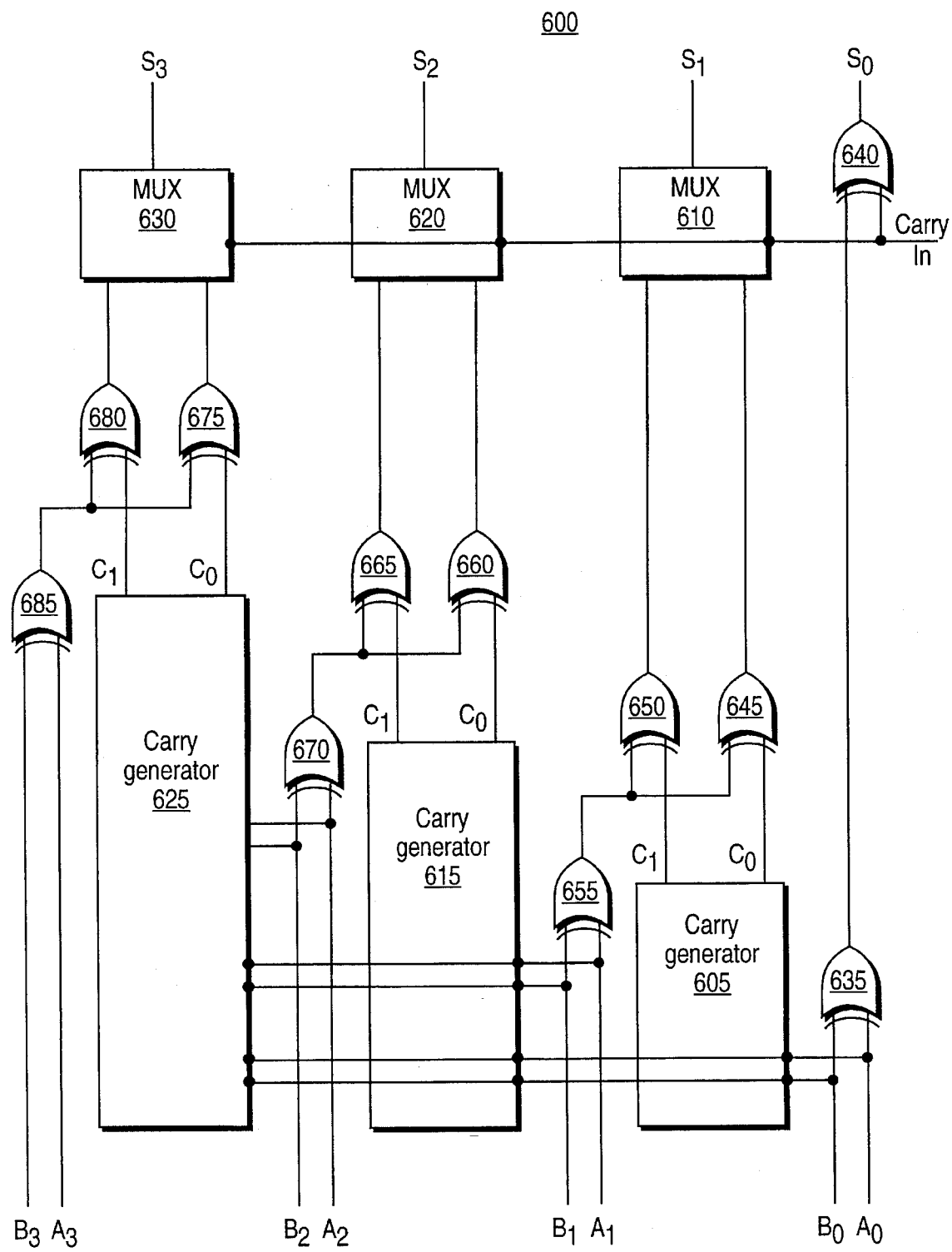
FIG. 6 illustrates in block diagram form the sum device of a sixth embodiment of the present invention.

FIG. 6 illustrates in block diagram form the sum device of a sixth embodiment of the present invention. In this embodiment, like the fifth embodiment, the adder is a 32 bit adder and thus n equals 4. Each block receives as its input 4 bits of two binary numbers. The four bits of the first binary number are labeled $A_0$, $A_1$, $A_2$ and $A_3$. The four bits of the second binary number are labeled $B_0$, $B_1$, $B_2$ and $B_3$. Sum device 600 receives as its inputs both four bits of the two binary numbers and a carry-in signal from the previous block or previous group. Sum device 600 outputs sum signals representing the sum of the four bits of the two binary numbers. These four bits are labeled as $S_0$, $S_1$, $S_2$ and $S_3$. Sum device 600 comprises carry generator 605, multiplexor 610, carry generator 615, multiplexor 620, carry generator 625 and multiplexor 630. To generate the first of the four bits of the sum of the two binary numbers, sum device 600 first receives as inputs the $A_0$ bit and $B_0$ bit. The $A_0$ bit and $B_0$ bit are provided as inputs to exclusive-OR gate 635. The output of exclusive-OR gate 635 is provided as an input to exclusive-OR gate 640 along with the carry-in signal. The output of exclusive-OR gate 640 becomes the sum signal representing the first of the four bits of the sum of the two binary numbers.

To generate the second of four bits comprising the sum of the two binary numbers, sum device 600 receives as inputs the $A_0$ bit and $B_0$ bit into carry generator 605. Carry generator 605 generates signals representing the carry after summing the $A_0$ bit, the $B_0$ bit and all lower bits. The first signal ($C_0$) represents the carry when the carry-in signal provided to sum device 600 is a zero. The second signal ($C_1$) represents the carry when the carry-in signal to sum device 600 is a one. Sum device 600 also receives as inputs the $A_1$ bit and $B_1$ bit which are in turn provided as inputs to exclusive-OR gate 655. The output of exclusive-OR gate 655 is provided as an input to exclusive-OR gate 650 along with the $C_1$ carry signal from carry generator 605. The output of exclusive-OR gate 655 is also provided to exclusive-OR gate 645 along with the $C_0$ carry signal from carry generator 605. The output of exclusive-OR gate 650 represents the second sum signal of the four bits comprising the sum when the carry-in signal to sum device 600 is a one. On the other hand, the output of exclusive-OR gate 645 represents the second sum signal second of the four bits comprising the sum when the carry-in signal provided to sum device 600 is a zero. The output of exclusive-OR gate 650 and the output of exclusive-OR gate 645 are provided as inputs to multiplexor 610. Multiplexor 610 selects either the output of exclusive-OR gate 650 or the output of exclusive-OR 645 gate based on the carry-in signal provided to sum device 600. If the carry-in signal is a one, multiplexor 610 selects the output of exclusive-OR gate 650. On the other hand, if the carry-in signal is a zero, multiplexor 610 selects the output of exclusive-OR gate 645.

To generate the third of four bits comprising the sum of the two binary numbers, sum device 600 receives as inputs the $A_0$ bit, the $B_0$ bit, the $A_1$ bit and the $B_1$ bit. The $A_0$ bit, the $B_0$ bit, the $A_1$ bit and the $B_1$ bits are provided to carry generator 615. Carry generator 615 generates two signals representing the carry after summing the $A_1$ bit, the $B_1$ bit and all lower bits. Sum device 600 also receives as inputs $A_2$ bit and the $B_2$ bit which are in turn provided as inputs to exclusive-OR gate 670. The output of exclusive-OR gate 670 is provided as an input to exclusive-OR gate 665 along with one of the carry signals from carry generator 615. The output of exclusive-OR gate 670 is also provided as an input to exclusive-OR gate 660 along with the other carry signal from carry generator 615. The output of exclusive-OR gate 665 represents the third of four bits of the sum of two binary numbers when the carry-in signal to sum device 600 is a one. The output of exclusive-OR gate 660 represents the third of four bits of the sum of the two binary numbers when the carry-in signal to sum device 600 is a zero. Multiplexor 620 selects between the output of exclusive-OR gate 665 and the output of exclusive-OR gate 660 in a manner similar to multiplexor 610.

To generate the fourth of four bits comprising the sum of the two binary numbers, sum device 600 receives the $A_0$, $B_0$, $A_1$, $B_1$, $A_2$ and $B_2$ bits as inputs to carry generator 625. Carry generator 625 generates signals representing the carry after summing the $A_2$ bit, the $B_2$ bit and all other lower bits. Sum device 600 also receives as inputs the $A_3$ bit and the $B_3$ bit. The $A_3$ and $B_3$ bits are provided as inputs to exclusive-OR gate 685. The output of exclusive-OR gate 685 is provided as an input to exclusive-OR gate 680 along with one of the carry signals from carry generator 625. The output of exclusive-OR gate 685 is also provided as an input to exclusive-OR 675 along with the other carry signal from carry generator 625. The output of exclusive-OR 680 represents the fourth of four bits of the sum of the two binary numbers when the carry-in signal to the sum device 600 is a one. On the other hand, the output of exclusive-OR gate 675 represents the fourth of four bits of the sum of the two binary numbers when the carry-in signal to the sum device 600 is a zero. Multiplexor 630 selects from the output of exclusive-OR gate 680 and the output of exclusive-OR gate 675 in a manner similar to multiplexor 620 and multiplexor 610.

It will be appreciated that sum device 600 of FIG. 6 employs lookahead techniques. Sum device 600 determines the possible values for the $S_1$, $S_2$ and $S_3$ bits before receiving the carry-in signal from previous blocks or groups. By the time the carry-in signal arrives at the sum device, sum device 600 has already determined the possible values for the $S_1$, $S_2$ and $S_3$ bits. When the carry-in signal arrives, it is used by multiplexors 610, 620 and 630 to select the proper values for the $S_1$, $S_2$ and $S_3$ bits. In this manner, sum device 600 is able to output the $S_1$, $S_2$ and $S_3$ bits shortly after it receives the carry-in signal. It does not have to wait for the carry-in signal to ripple through the sum device. Sum device 600 of FIG. 6 can be used in place of sum device 210, 230, 250, 270, 290, 310, 330 or 350 of FIG. 3.

Figure 7:
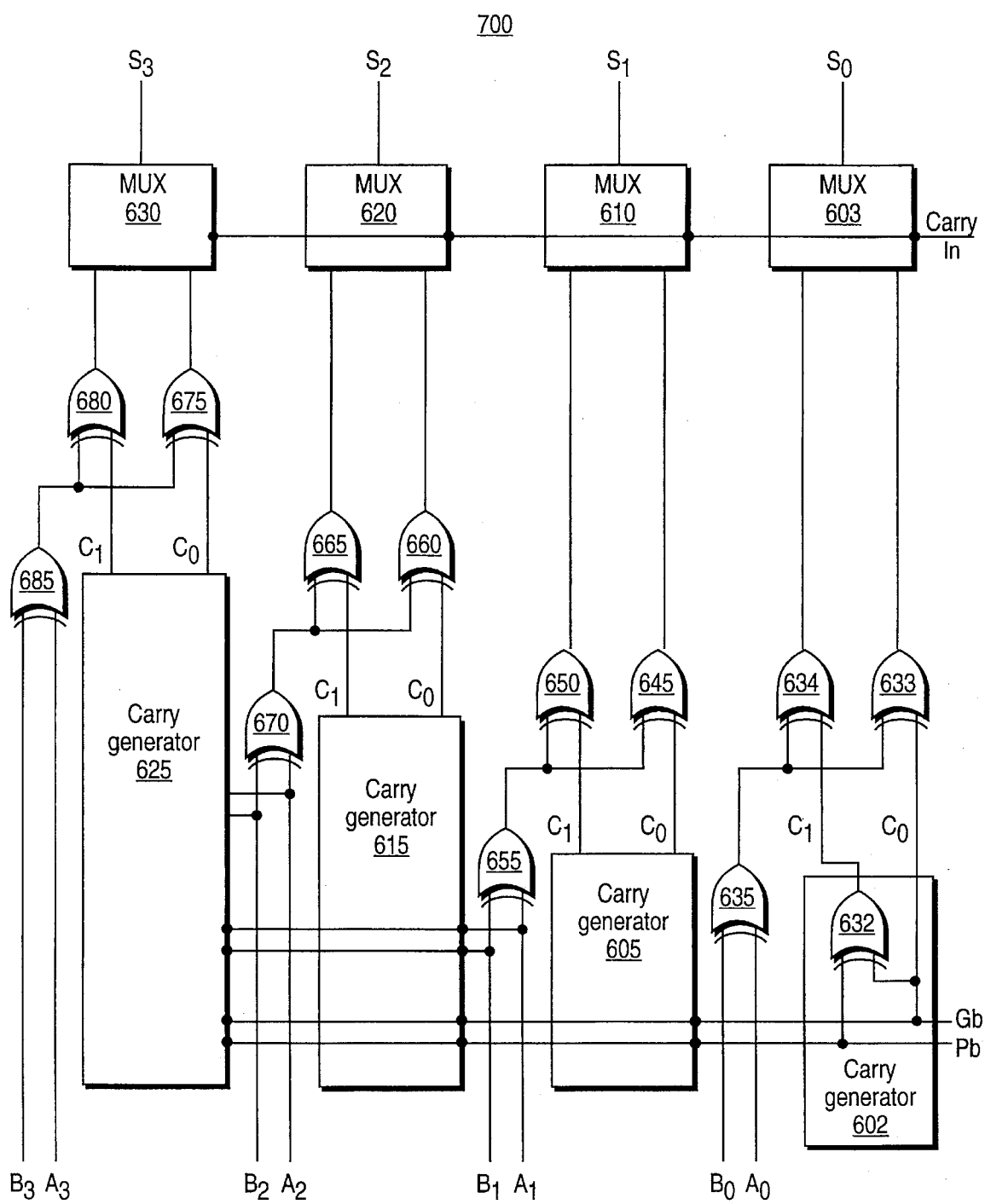
FIG. 7 illustrates in block diagram form the sum device of a seventh embodiment of the present invention.

FIG. 7 illustrates in block diagram form the sum device of a seventh embodiment of the present invention. In this embodiment, sum device 700 operates similarly to the sum device of FIG. 6 with the following exceptions. Instead of receiving a carry-in signal from the previous block, sum device 700 of the seventh embodiment receives a carry-in signal from a block prior to the previous block. As a consequence, the three carry generators receive as inputs a block generate signal and a block propagate signal from the prior block in addition to the inputs described under FIG. 6. It will be appreciated that sum device 700 also employs lookahead techniques. Sum device 700 generates possible values for the $S_0$, $S_1$, $S_2$ and $S_3$ bits in advance. When the carry-in signal from the block prior to the previous block is generated, sum device 700 selects the proper value for $S_0$, $S_1$, $S_2$ and $S_3$ bits. In this manner, the sum signals for the present block can be generated at the same time as the sum signals for the previous block by using the same sum select signal. Sum device 700 can be used in place of sum device 410 or 450 of FIG. 4. Here, the carry-in signal would be the carry-out signal from block 265 ($C_{0b4}$) or the carry-out signal from group 145 ($C_{0g3}$).

Figure 8:
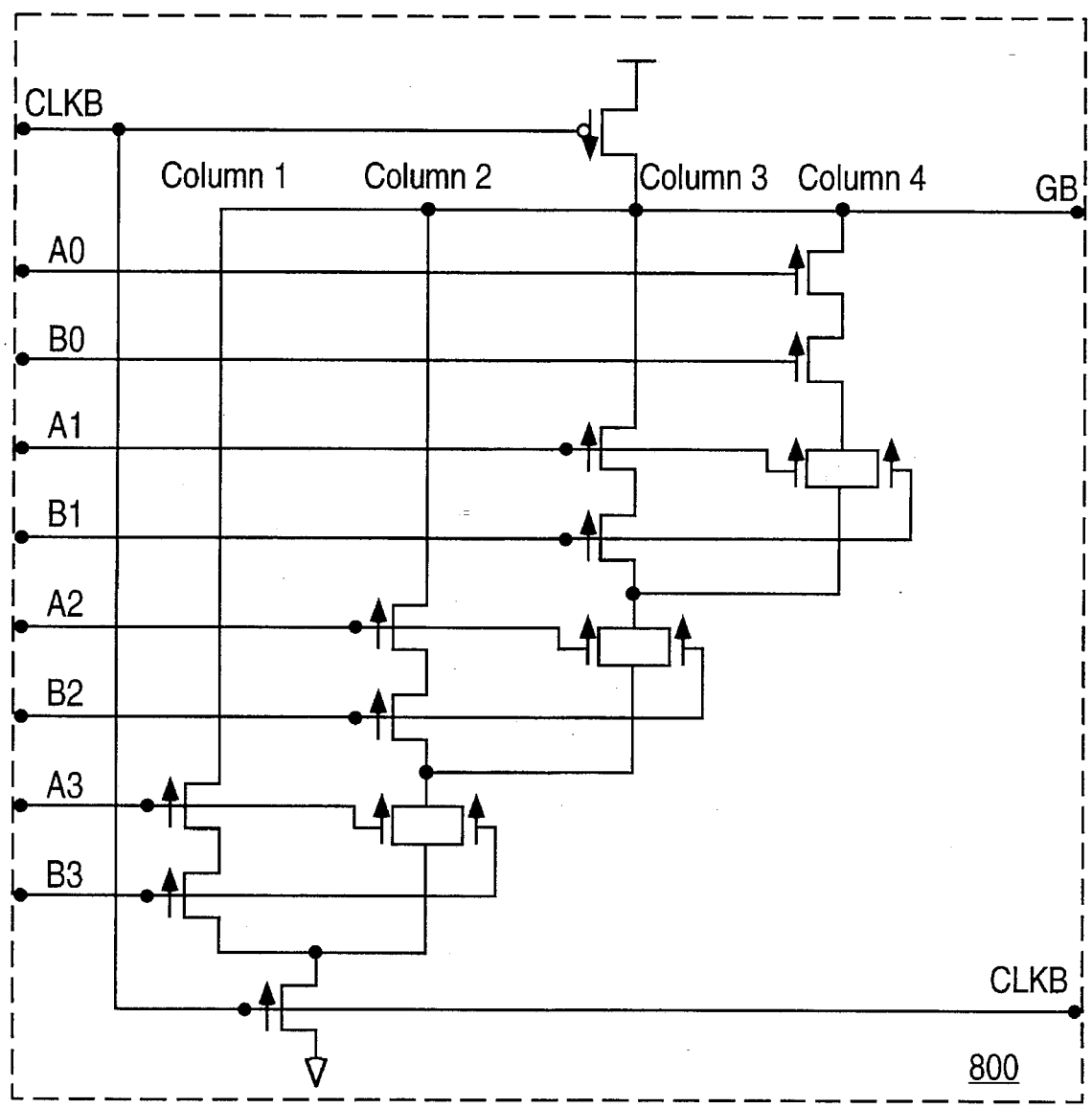
FIG. 8 illustrates in circuit diagram form a block generate device of an eighth embodiment of the present invention.

FIG. 8 illustrates in circuit diagram form a block generate device of an eighth embodiment of the present invention. Block generate device 800 receives the $A_0$, $B_0$, $A_1$, $B_1$, $A_2$, $B_2$, $A_3$, and $B_3$ bits as inputs. It outputs a block generate signal for the bits it receives as inputs. Block generate device 800 comprises four columns. The four columns are coupled in parallel and the gates of the transistors are coupled to the inputs. Thus, block generate device 800 can generate a block generate signal after one domino gate delay. Block generate 800 device can also generate a block generate signal with one precharge cycle or with one discharge cycle. The first column comprises two n-channel transistors coupled in series. The gate of one transistor is coupled to the $A_3$ bit and the gate of the other transistor is coupled to the $B_3$ bit. The two n-channel transistors coupled in series acts as a NAND gate. Column 2 comprises of the series combination of two n-channel transistors and two n-channel transistors coupled in parallel. The gate of one n-channel transistor in series is coupled to the $A_2$ bit and the gate of the other n-channel transistor in series is coupled to the $B_2$ bit. The gate of one n-channel transistor in parallel is coupled to the $A_3$ bit and the gate of the other n-channel transistor in parallel is coupled to the $B_3$ bit. The two n-channel transistors in series act as a NAND gate and the two n-channel transistors in parallel act as a NOR gate. Column 3 is similar to column 2 except that the gate of one n-channel transistor in series is coupled to the $A_1$ bit, the gate of the other n-channel transistor in series is coupled to the $B_1$ bit, the gate of one n-channel transistor in parallel is coupled to the $A_2$ bit and the gate of the other n-channel transistor in parallel is coupled to the $B_2$ bit. The fourth column is similar to the third column except that the gate of one n-channel transistor in series is coupled to the $A_0$ bit, the gate of the other n-channel transistor in series is coupled to the $B_0$ bit, the gate of one n-channel transistor in parallel is coupled to the $A_1$ bit and the gate of the other n-channel transistor in parallel is coupled to the $B_1$ bit. The n-channel transistors in parallel of column 2 is not only coupled to the n-channel transistors in series but is also coupled to column 3 by a parallel connection. This allows the n-channel transistors in parallel of column 2 to provide signals not only to column 2 but also to column 3 and results in the reduction of two transistors from the circuit. Similarly the n-channel transistors of column 3 is not only coupled to the n-channel transistors in series but is also coupled to column 4. This allows for the additional reduction of four transistors of the circuit (two for the parallel transistors in column 3 and two for the parallel transistors in column 2). It will be appreciated that the n-channel transistors in series transmit an equivalent of a generate signal for the respective A and B bits. On the other hand, the n-channel transistors in parallel transmit the equivalent of a propagate signal for the respective A and B bits. Block generate device 800 also utilizes a precharge mechanism for speed. When the dock signal is low, the block generate line is charged to a high potential. During evaluation, the dock signal switches high. The p-channel transistor coupled to the dock signal is turned off and the n-channel transistor coupled to the clock signal is turned on. When the conditions for a block generate signal is satisfied, an electrical path to ground is created from the block generate line. This path to ground discharges the block generate line, thus creating the block generate signal. It will be appreciated that the block generate signal described above is an active low signal. Block generate device 800 can be used in place of block generate device 215, 235, 255, 275, 295, 315, 335 or 355 of FIG. 3.

Figure 9:
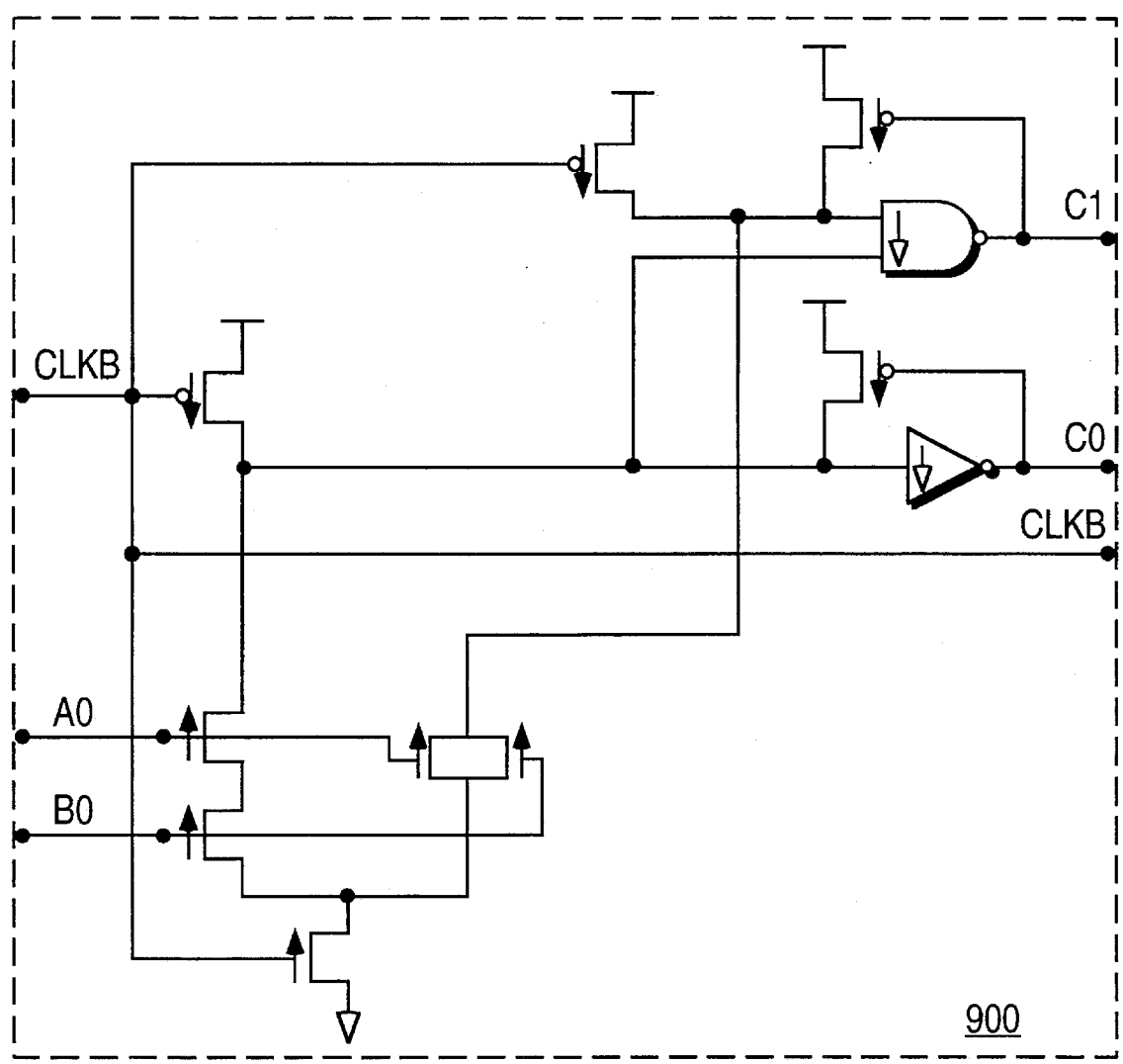
FIG. 9 illustrates in circuit diagram form a carry generator of a ninth embodiment of the present invention.

FIG. 9 illustrates in circuit diagram form a carry generator of a ninth embodiment of the present invention. Carry generator 900 receives as its inputs the $A_0$ bit and the $B_0$ bit. It outputs signals representing the carry after summing the $A_0$ bit, the $B_0$ bit and all lower bits. The first carry signal ($C_1$) represents the carry when the carry-in signal to the $A_0$ and $B_0$ bits is a 1. On the other hand the second carry signal ($C_0$) represents the carry when the carry-in to the $A_0$ and the $B_0$ bits is a 0. The n-channel transistors in series and the n-channel transistors in parallel function similarly as in block generate device 800 of FIG. 8. Carry generator 900 can generate a carry signal after one domino gate delay.

Carry generator 900 can also generate a carry signal with one precharge cycle or with one discharge cycle. In addition, carry generator 900 utilizes the precharged techniques and active blow features as in block generate device 800 of FIG. 8. Carry generator 900 can be utilized in place of carry generator 605 of FIG. 6.

Figure 10:
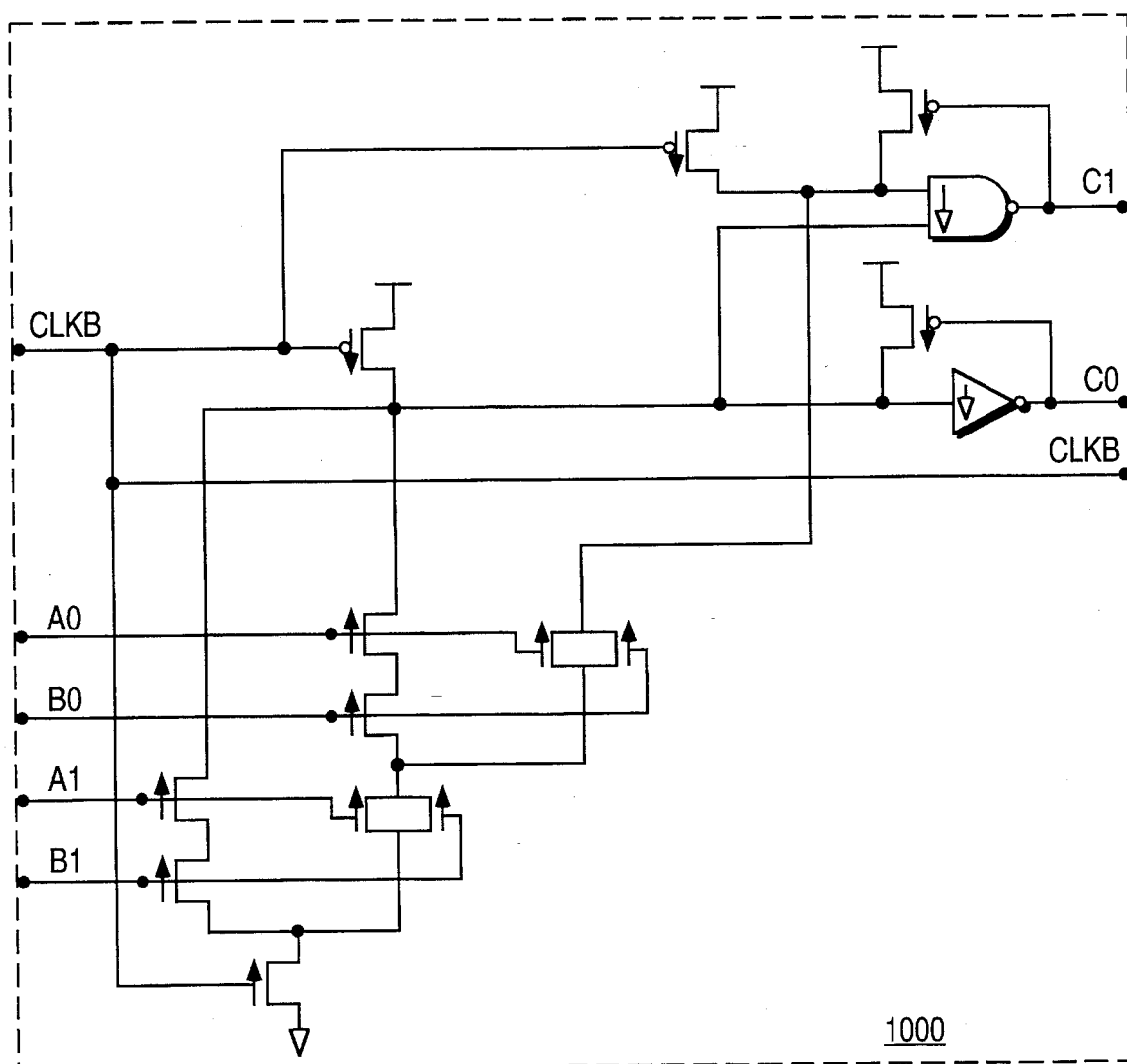
FIG. 10 illustrates in circuit diagram form a carry generator of a tenth embodiment of the present invention.

FIG. 10 illustrates in circuit diagram form a carry generator of a tenth embodiment of the present invention. Carry generator 1000 receives as inputs the $A_0$ bit, the $B_0$ bit, the $A_1$ bit and the $B_1$ bit. Carry generator 1000 generates two signals representing the carry after summing the $A_1$ bit, the $B_1$ bit and all lower bits. The first signal ($c_1$) represents the carry to the third bit to generate the third of four bits of the sum of two binary numbers when the carry-in signal from the previous block is a one. The second signal ($c_0$) represents the carry to the third bit to generate the third of four bits of the sum of the two binary numbers when the carry-in signal from the previous block is a zero. The n channel transistors in series operate similarly to the n channel transistors in series of FIG. 8 and the n channel transistors in parallel operate similarly to the n channel transistors in parallel of FIG. 8. Carry generator 1000 can generate a carry signal after one domino gate delay. Carry generator 1000 can also generate a carry signal with one precharge cycle or with one discharge cycle. In addition, carry generator 1000 employs precharge techniques and active low features as described under FIG. 8. Carry generator 1000 can be utilized as carry generator 615 of FIG. 6.

Figure 11:
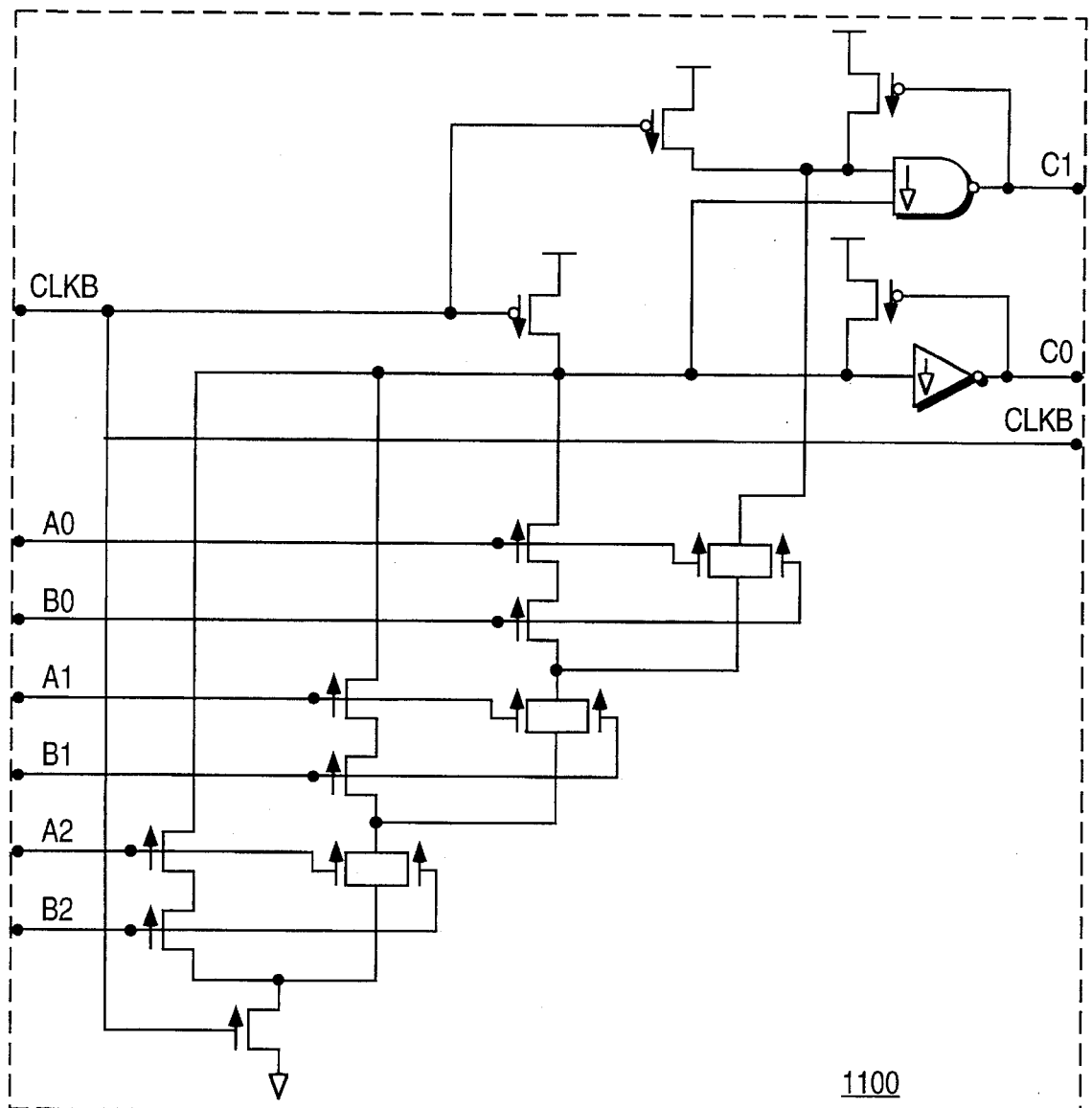
FIG. 11 illustrates in circuit diagram form a carry generator of an eleventh embodiment of the present invention.

FIG. 11 illustrates in circuit diagram form a carry generator of an eleventh embodiment of the present invention. Carry generator 1100 receives as inputs the $A_0$ bit, the $B_0$ bit, the $A_1$ bit, the $B_1$ bit, the $A_2$ bit and the $B_2$ bit. Carry generator 1000 generates two signals representing the carry after summing the $A_2$ bit, the $B_2$ bit and all lower bits. The first signal ($c_1$) represents the carry to the fourth bit to generate the fourth of four bits of the sum of two binary numbers when the carry-in signal from the previous block is a one. The second signal ($c_0$) represents the carry to the fourth bit to generate the fourth of four bits of the sum of the two binary numbers when the carry-in signal from the previous block is a zero. The n channel transistors in series and the n channel transistors in parallel operate similarly as described above. Carry generator 1100 can generate a carry signal after one domino gate delay. Carry generator 1100 can also generate a carry signal with one precharge cycle or with one discharge cycle. The circuit which generates the $C_0$ signal and the circuit which generates the $C_1$ signal shares hardware which reduces device count and gate loading. In addition, carry generator 1100 employs precharge techniques and active low features as described above. Carry generator 1100 can be utilized as carry generator 625 of FIG. 6.

Figure 12:
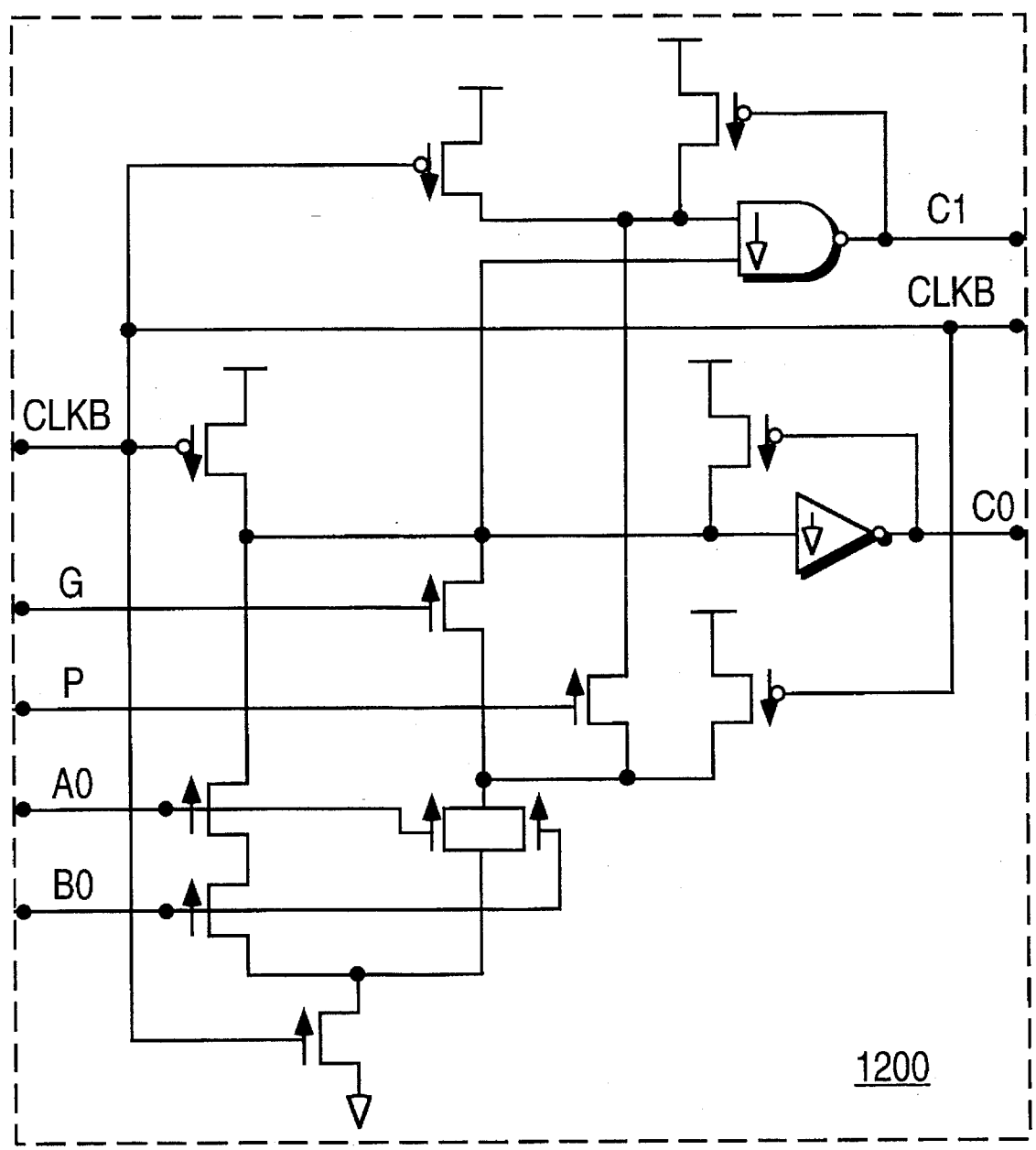
FIG. 12 illustrates in circuit diagram form a carry generator of a twelfth embodiment of the present invention.

FIG. 12 illustrates in circuit diagram form a carry generator of a twelfth embodiment of the present invention. Carry generator 1200 receives as inputs the $A_0$ bit, the $B_0$ bit, a block propagate signal from the previous block and a block generate signal from the previous block. Carry generator 1200 generates two signals representing the carry after summing the $A_0$ bit, the $B_0$ bit and all lower bits. The first signal ($c_1$) represents the carry to the second bit to generate the second of four bits of the sum of two binary numbers when the carry-in signal from the block prior to the previous block is a one. The second signal ($c_0$) represents the carry to the second bit to generate the second of four bits of the sum of the two binary numbers when the carry-in signal from the block prior to the previous block is a zero. The n-channel transistors in series and the n channel transistors in parallel operate similarly as described above. The circuit which generates the $C_0$ signal and the circuit which generates the $C_1$ signal share hardware which reduces device count and gate loading. Carry generator 1200 can generate a carry signal after one domino gate delay. Carry generator 1200 can also generate a carry signal with one precharge cycle or with one discharge cycle. In addition, carry generator 1200 employs precharge techniques and active low features as described above. Carry generator 1200 can be utilized as carry generator 605 of FIG. 7.

Figure 13:
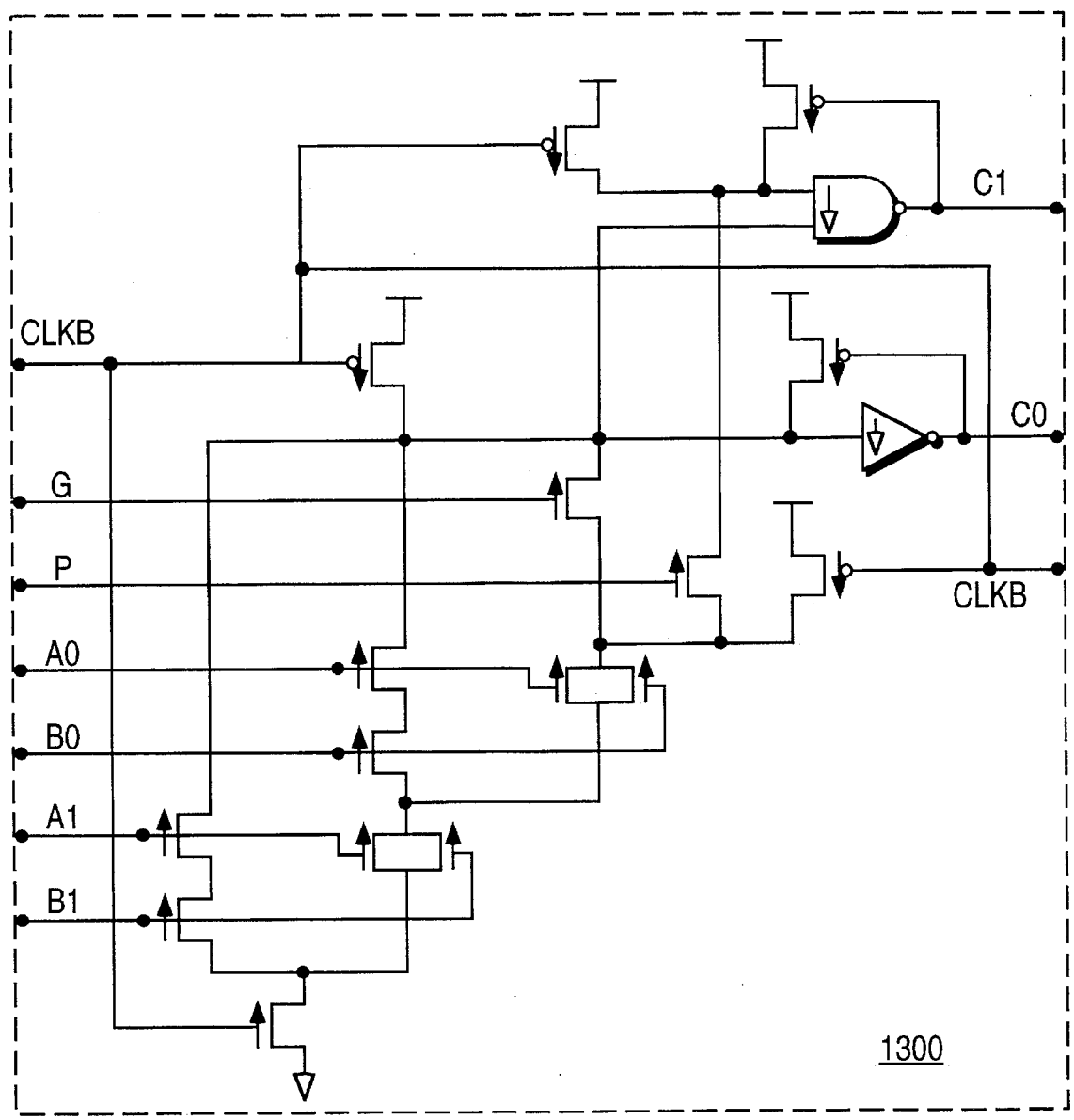
FIG. 13 illustrates in circuit diagram form a carry generator of a thirteenth embodiment of the present invention.

FIG. 13 illustrates in circuit diagram form a carry generator of a thirteenth embodiment of the present invention. Carry generator 1300 receives as inputs the $A_0$ bit, the $B_0$ bit, the $A_1$ bit, the $B_1$ bit, a block propagate signal from the previous block and a block generate signal from the previous block. Carry generator 1300 generates two signals representing the carry after summing the $A_1$ bit, the $B_1$ bit and all lower bits. The first signal ($c_1$) represents the carry to the third bit to generate the third of four bits of the sum of two binary numbers when the carry-in signal from the block prior to the previous block is a one. The second signal ($c_0$) represents the carry to the third bit to generate the third of four bits of the sum of the two binary numbers when the carry-in signal from the block prior to the previous block is a zero. The n channel transistors in series and the n channel transistors in parallel operate similarly as described above. Carry generator 1300 can generate a carry signal after one domino gate delay. Carry generator 1300 can also generate a carry signal with one precharge cycle or with one discharge cycle. In addition, carry generator 1300 employs precharge techniques and active low features as described above. Carry generator 1300 can be utilized as carry generator 615 of FIG. 7.

Figure 14:
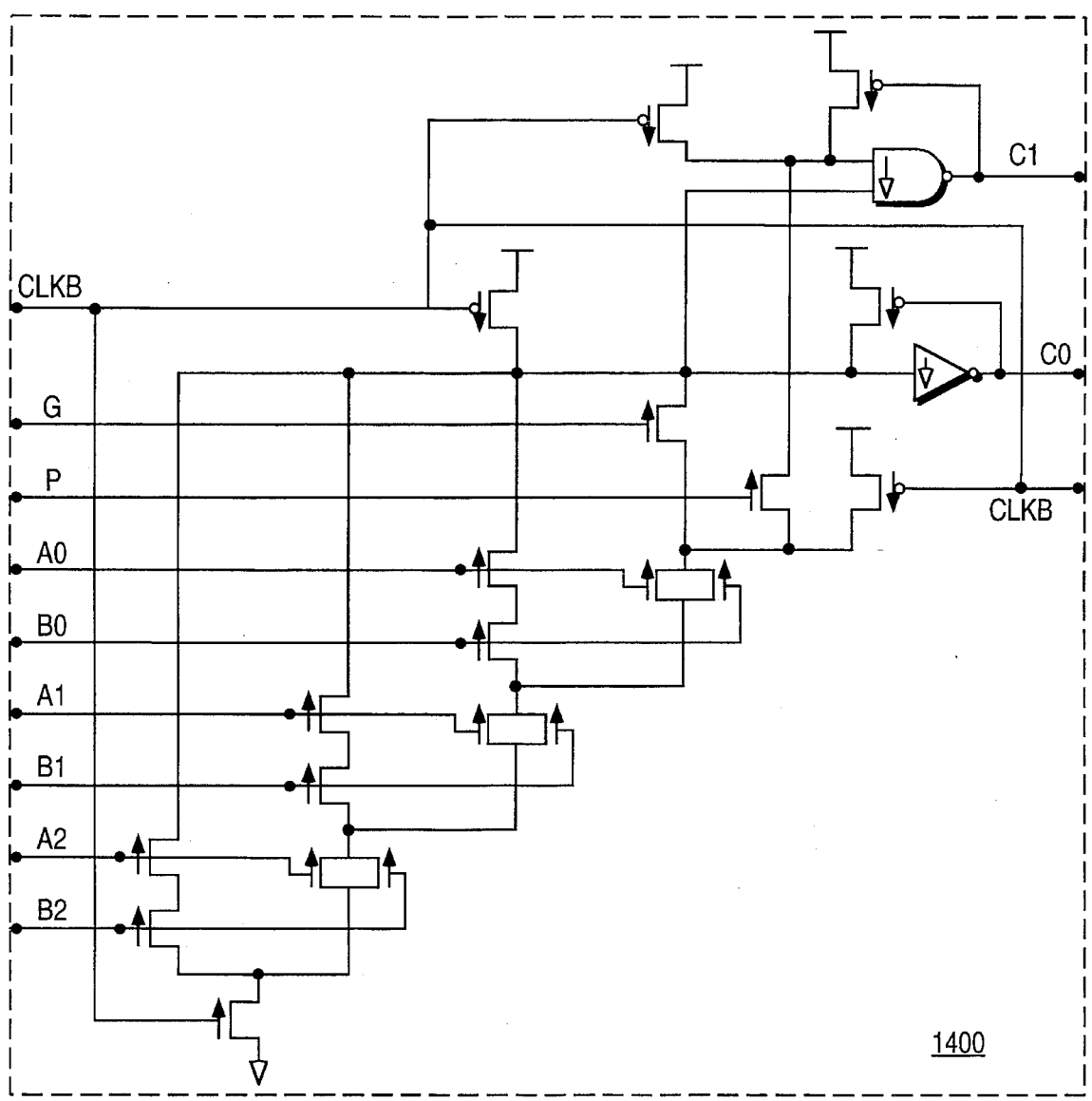
FIG. 14 illustrates in circuit diagram form a carry generator of a fourteenth embodiment of the present invention.

FIG. 14 illustrates in circuit diagram form a carry generator of a fourteenth embodiment of the present invention. Carry generator 1400 receives as inputs the $A_0$ bit, the $B_0$ bit, the $A_1$ bit, the $B_1$ bit, the $A_2$ bit, the $B_2$ bit, a block propagate signal from the previous block and a block generate signal from the previous block. Carry generator 1400 generates two signals representing the carry after summing the $A_2$ bit, the $B_2$ bit and all lower bits. The first signal ($c_1$) represents the carry to the fourth bit to generate the fourth of four bits of the sum of two binary numbers when the carry-in signal from the block prior to the previous block is a one. The second signal ($c_0$) represents the carry to the fourth bit to generate the fourth of four bits of the sum of the two binary numbers when the carry-in signal from the block prior to the previous block is a zero. The n channel transistors in series and the n channel transistors in parallel operate similarly as described above. Carry generator 1400 can generate a carry signal after one domino gate delay. Carry generator 1400 can also generate a carry signal with one precharge cycle or with one discharge cycle. In addition, carry generator 1400 employs precharge techniques and active low features as described above. Carry generator 1400 can be utilized as carry generator 625 of FIG. 7.

In the foregoing description, the invention is described with reference to specific exemplary embodiments thereof. It will, however, be evident that various modifications and changes may be made thereto without departing from the broader spirit and scope of the invention as set forth in the appended claims. The specifications and drawings are, accordingly, to be regarded in an illustrative rather than a restrictive sense.

Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims, which in themselves recite only those features regarded as essential to the invention.

Thus, a novel adder has been described.

What is claimed is:

1. An adder comprising:
   a first group generating sum signals for n bits and generating a first carry-out signal;
   a second group generating sum signals for 2n bits and generating a second carry-out signal;
   a first pass gate coupled to said second group;
   a third group coupled to receive said first carry-out signal through said first pass gate responsive to an output of said second group, said third group generating sum signals for 3n bits;
   a second pass gate coupled to said third group; and
   a fourth group generating sum signals for 2n bits, said fourth group coupled to receive said second carry-out signal through a second pass gate responsive to an output of said third group.

2. The adder of claim 1 wherein said first group comprises a first block generating a carry-out signal in response to signals from a first n bits.

3. The adder of claim 1 wherein said second group comprises:
   a second block generating sum signals for a second n bits;
   a third block generating sum signals for a third n bits.

4. The adder of claim 3 wherein said third group comprises:
   a fourth block generating sum signals for a fourth n bits;
   a fifth block generating sum signals for a fifth n bits;
   a sixth block generating sum signals for a sixth n bits.

5. The adder of claim 4 wherein said sixth block comprises:
   a carry-out generator generating a carry-out signal in response to a block propagate signal from said sixth block, a block generate signal from said sixth block and a carry-out signal from said fifth block.

6. The adder of claim 4 wherein said sixth block comprises:
   a carry-out generator generating a carry-out signal in response to propagate signals for said sixth n bits, generate signals for said sixth n bits, and a carry-out signal from said fifth block.

7. The adder of claim 4 wherein said sixth block comprises:
   a sum signal generator generating a sum signal in response to propagate signals for said fifth n bits, generate signals for said fifth n bits, and a carry-out signal from said fourth block.

8. The adder of claim 4 wherein said fourth group comprises:
   a seventh block generating sum signals for a seventh n bits;
   an eighth block generating sum signals for an eighth n bits.

9. The adder of claim 8 wherein said eighth block comprises:
   a sum signal generator generating a sum signal in response to a block propagate signal from said seventh block, a block generate signal from said seventh block and a carry-out signal from said sixth block.

10. The adder of claim 1 further comprising:
    a block generate generator generating a block generate signal within one domino gate delay.

11. The adder of claim 1 further comprising:
    a carry-out generator generating a carry-out signal within one domino gate delay.

12. An adder comprising:
    a first group capable of generating sum signals for n bits and capable of generating a first carry-out signal;
    a second group capable of generating sum signals for 2n bits, wherein said second group includes:
        a second block capable of generating sum signals for a second n bits; and
        a third block capable of generating sum signals for a third n bits and capable of generating a second carry-out signal;
    a first pass gate controlled by said second group;
    a third group capable of generating sum signals for 3n bits, said third group coupled to receive said first carry-out signal through said first pass gate, wherein said third group includes:
        a fourth block capable of generating sum signals for a fourth n bits;
        a fifth block capable of generating sum signals for a fifth n bits; and
        a sixth block capable of generating sum signals for a sixth n bits;
    a second pass gate controlled by said third group; and
    a fourth group capable of generating sum signals for 2n bits, said fourth group coupled to receive said second carry-out signal through said second pass gate, wherein said fourth group includes:
        a seventh block capable of generating sum signals for a seventh n bits; and
        an eighth block capable of generating sum signals for an eighth n bits, wherein said eighth block includes a sum signal generator capable of generating a sum signal in response to a carry-out signal from said sixth block.

13. A carry skip adder including a block generate circuit, the block generate circuit for generating a block generate signal corresponding to a first plurality of bits of a first binary number and a second plurality of corresponding bits of a second binary number to be added to the first binary number, the block generate circuit comprising:
    precharge circuitry responsive to a clock signal, the precharge circuitry precharging an output of the block generate circuit representing the block generate signal during a precharge phase of the clock signal; and
    discharge circuitry coupled to the output, the discharge circuitry selectively discharging the output in response to each of the first plurality of bits and the second plurality of bits during an evaluation phase of the clock signal, the discharge circuitry including:
        a first column including a first series pair of transistors, each of said first series pair separately controlled by a first bit in each of the two numbers;
        a second column coupled in parallel with the first column, the second column including a second series pair of transistors coupled in series with a first parallel pair of transistors, each of said first series pair separately controlled by a second bit in each of said two numbers, each of said first parallel pair separately controlled by the first bit in each of the two numbers;

a third column coupled in parallel with the series combination of the second series pair of transistors and the first parallel pair of transistors, the third column including a third series pair of transistors coupled in series with a second parallel pair of transistors, each of said third series pair of transistors separately controlled by a third bit in each of said two numbers, each of said second parallel pair of transistors separately controlled by the second bit in each of the two numbers; and a fourth column coupled in parallel with the third series pair of transistors, the fourth column including a fourth series pair of transistors coupled in series with a third parallel pair of transistors, each of said fourth series pair of transistors separately controlled by a fourth bit in each of said two numbers, each of said third parallel pair of transistors separately controlled by the third bit in each of the two parallel numbers.

14. A carry skip adder according to claim 13, wherein the discharge circuitry selectively discharges the output in response to each of the first plurality of bits and the second plurality of bits during the first evaluation phase of the clock signal immediately following the precharge phase.

15. A computer system comprising:

a memory; and a processor coupled to the memory, the processor including an adder, the adder including:
   a first group generating sum signals for n bits and generating a first carry-out signal;
   a second group coupled to the first group, the second group generating sum signals for 2n bits and generating a second carry-out signal;
   a first pass gate coupled to said second group;
   a third group coupled to receive said first carry-out signal through said first pass gate responsive to an output of said second group, said third group generating sum signals for 3n bits;
   a second pass gate coupled to said third group; and
   a fourth group generating sum signals for 2n bits, said fourth group coupled to receive said second carry-out signal through the second pass gate responsive to an output of said third group.

16. A computer system according to claim 15 wherein said first group comprises a first block generating a carry-out signal in response to signals from a first n bits.

17. A computer system according to claim 16 wherein said second group comprises:

a second block generating sum signals for a second n bits; and a third block coupled to the second block, the third block generating sum signals for a third n bits.

18. A computer system according to claim 17 wherein said third group comprises:

a fourth block generating sum signals for a fourth n bits;

a fifth block coupled to the fourth block, the fifth block generating sum signals for a fifth n bits; and a sixth block coupled to the fifth block, the fifth block generating sum signals for a sixth n bits.

19. A computer system according to claim 18 wherein said sixth block comprises:

a carry-out generator generating a carry-out signal in response to a block propagate signal from said sixth block, a block generate signal from said sixth block, and a carry-out signal from said fifth block.

20. A computer system comprising:

a memory; and a processor coupled to the memory, the processor including a carry skip adder, the carry skip adder including a block generate circuit for generating a block generate signal, the block generate signal corresponding to a first plurality of bits of a first binary number and a second plurality of corresponding bits of a second binary number to be added to the first binary number, the block generate circuit including:
   precharge circuitry responsive to a clock signal, the precharge circuitry for precharging an output of the block generate circuit representing the block generate signal during a precharge phase of the clock signal; and
   discharge circuitry coupled to the output, the discharge circuitry for selectively discharging the output in response to each of the first plurality of bits and the second plurality of bits during an evaluation phase of the clock signal, the discharge circuitry including:
      a first column including a first series pair of transistors, each transistor of said first series pair separately controlled by a first bit in each of said first binary number and said second binary number;
      a second column coupled in parallel with the first column, the second column including a second series pair of transistors coupled in series with a first parallel pair of transistors, each transistor of said first series pair separately controlled by a second bit in each of said first binary number and said second binary number, each transistor of said first parallel pair separately controlled by the first bit in each of said first binary number and said second binary number;
      a third column coupled in parallel with the series combination of the second series pair of transistors and the first parallel pair of transistors, the third column including a third series pair of transistors coupled in series with a second parallel pair of transistors, each transistor of said third series pair of transistors separately controlled by a third bit in each of said first binary number and said second binary number, each transistor of said second parallel pair of transistors separately controlled by the second bit in each of said first binary number and said second binary number; and
      a fourth column coupled in parallel with the third series pair of transistors, the fourth column including a fourth series pair of transistors coupled in series with a third parallel pair of transistors, each transistor of said fourth series pair of transistors separately controlled by a fourth bit in each of said first binary number and said second binary number, each transistor of said third parallel pair of transistors separately controlled by the third bit in each of said first binary number and said second binary number.

21. A computer system according to claim 20 wherein the discharge circuitry selectively discharges the output in response to each of the first plurality of bits and the second plurality of bits during the first evaluation phase of the clock signal following the precharge phase.

* * * * *

UNITED STATES PATENT AND TRADEMARK OFFICE
CERTIFICATE OF CORRECTION

PATENT NO.   : 5,581,497
DATED        : December 3, 1996
INVENTOR(S)  : Sudarshan Kumar It is certified that error appears in the above-identified patent and that said Letters Patent is hereby corrected as shown below:

In column 5 at line 46 delete "filth" and insert --fifth--

In column 5 at line 53 delete "stun" and insert --sum--

In column 9 at line 25 delete "stun" and insert --sum--

In column 10 at line 43 delete "dock" and insert --clock--

In column 10 at line 45 delete "dock" and insert --clock--

In column 10 at line 46 delete "dock" and insert --clock--

In column 15 at line 18 delete "parallel"

Signed and Sealed this

Twenty-fifth Day of February, 1997

Attest:

BRUCE LEHMAN

Attesting Officer        Commissioner of Patents and Trademarks